United States Patent [19]
Keyes et al.

[11] Patent Number: 5,680,960
[45] Date of Patent: *Oct. 28, 1997

[54] VOLUMETRIC FLUID DISPENSING APPARATUS

[76] Inventors: Denis E. Keyes, P.O. Box 507, Rocky Hill, N.J. 08553-0507; John R. Randall, 72 Stratford Dr., Freehold, N.J. 07728; James V. Curcio, 113 New York Ave., South Plainfield, N.J. 07080

[*] Notice: The term of this patent shall not extend beyond the expiration date of Pat. No. 5,480,063.

[21] Appl. No.: 441,617

[22] Filed: May 15, 1995

Related U.S. Application Data

[63] Continuation-in-part of Ser. No. 225,803, Apr. 11, 1994, Pat. No. 5,480,063, which is a continuation-in-part of Ser. No. 26,878, Mar. 5, 1993, abandoned.

[51] Int. Cl.$^6$ ............................................. B67D 5/08
[52] U.S. Cl. .................... 222/64; 222/318; 137/563
[58] Field of Search ...................... 222/64, 67, 639, 222/386.5, 212, 215; 141/198; 137/139, 558, 563, 396

[56] References Cited

U.S. PATENT DOCUMENTS

| | | | |
|---|---|---|---|
| 2,860,785 | 11/1958 | Gardner | 210/95 |
| 2,865,541 | 12/1958 | Hicks | 222/386.5 |
| 2,967,004 | 1/1961 | Lipshutz et al. | 222/639 |
| 5,203,367 | 4/1993 | Akai et al. | 137/101.25 |

*Primary Examiner*—Andres Kashnikow
*Assistant Examiner*—Lisa Ann Douglas
*Attorney, Agent, or Firm*—Rhodes, Coats & Bennett, L.L.P.

[57] ABSTRACT

A fluid dispensing apparatus includes a fluid reservoir comprising a flexible bag-like enclosure. The fluid reservoir includes a discharge valve connected to a fluid output for dispensing fluid from said fluid reservoir. An electronic controller selectively opens and closes the discharge valve to dispense a predetermined volume of fluid from said fluid reservoir. The fluid reservoir is flexible so that it expands and contracts to maintain the internal pressure of the fluid reservoir constant. In an alternate embodiment, the fluid reservoir has a rigid wall and is provided with an external bladder which expands and contracts to maintain the internal pressure of the fluid reservoir constant. The fluid dispensing apparatus can be configured either as a volumetric filler or as a time pressure filler.

29 Claims, 10 Drawing Sheets

VOLUMETRIC FLUID DISPENSING APPARATUS

This is a continuation-in-part of U.S. Application Ser. No. 08/225,803 filed Apr. 11, 1994, now U.S. Pat. No. 5,480,063, which is a continuation-in-part of U.S. application Ser. No. 08/026,878 filed on Mar. 5, 1993, now abandoned entitled A Volumetric Fluid Dispensing Apparatus.

BACKGROUND OF THE INVENTION

The present invention relates generally to fluid dispensing apparatuses, and more particularly to a volumetric fluid dispensing apparatus having no moving parts in contact with the fluid.

Numerous types of fluid dispensing apparatuses exist for filling bottles. One type of fluid dispensing apparatus which is in widespread use is positive displacement fillers. Positive displacement fillers typically include moving parts which contact and displace the fluid being dispensed. For example, one type of positive displacement filler uses a piston and cylinder arrangement. In this type of positive displacement filler, the backward movement of the piston draws fluid into the cylinder through an inlet port and the forward movement of the piston expels the fluid through an outlet port. Another type of positive displacement filler uses a rotary pump to move the fluid.

Positive displacement pumps have gained widespread use in the United States for two reasons. First, positive displacement pumps can operate at relatively high speeds, filling as many as six hundred bottles per minute. Additionally, positive displacement pumps are accurate up to about ±0.5%.

Despite the widespread use of positive displacement fillers, they nevertheless have several disadvantages. One disadvantage with positive displacement fillers is that the fluid comes into contact with moving parts. As the moving parts wear, particulate matter enters the fluid causing particulate contamination. If severe enough, particulate contamination can render the product unusable. Another disadvantage with positive displacement fillers involves the difficulty in cleaning and sterilizing the moving parts in contact with the fluid. In positive displacement pumps, the critical tolerances between pads, such as the piston and cylinder, precludes effective cleaning in place. Thus, the user must disassemble the apparatus for cleaning and sterilization. This process is not only time consuming, but may result in biological contamination of the pads when they are handled by the mechanic during reassembly.

Another type of fluid dispensing apparatus is the time/pressure filler. Generally speaking, the time/pressure filler includes a fluid reservoir which is maintained under a relatively constant pressure. The fluid is dispensed from the reservoir through a compressible line. Fluid flow is shut off by a pinch type valve which squeezes and collapses the discharge line. A pre-determined volume of fluid is dispensed by opening the discharge line for a pre-determined period of time and then closing the line. If the pressure within the fluid reservoir is maintained constant, an equal amount of fluid should be dispensed each time the cycle is repeated. However, time/pressure fillers do not work as well in practice as they do in theory.

The primary difficulty with the time/pressure filling apparatuses is that the tubing is deformed to shut off fluid flow and does not always return to its undeformed state immediately, particularly when the apparatus has been sitting idle for a long period of time. Thus, the critical orifice through which the fluid is dispensed may vary somewhat from the fully open line. The variance in the critical orifice will cause the fluid flow through the discharge line to vary until the discharge line returns to its undeformed condition. As a result, time/pressure fillers will be less accurate during the first few filling cycles. Furthermore, it is difficult to use clarification filters in time/pressure fillers since it also requires a constant pressure. The pressure drop across the filter introduces a variable which can result in inaccurate filling.

A third type of fluid dispensing apparatus is shown in U.S. Pat. No. 5,090,594 which discloses a volumetric fluid dispensing apparatus. The volumetric dispensing apparatus measures a predetermined volume of fluid in a measuring cup or fill tube which is subsequently dispensed into a receptacle. Volumetric fillers, while slower than positive displacement fillers, are highly accurate and avoid the problems of microbial and particulate contamination. However, volumetric fillers, like time/pressure fillers, depend on a relatively constant pressure. For this reason, it is impractical to use clarification filters in volumetric fillers since the pressure drop across the filter may result in inaccurate filling.

SUMMARY AND OBJECTS OF THE INVENTION

The present invention is a fluid dispensing apparatus having a flexible fluid reservoir which expands and contracts to maintain a constant internal pressure. The preferred embodiment of the present invention comprises a volumetric filler such as that described in my co-pending application, Ser. No. 08/225,803, filed Apr. 11, 1994, which is incorporated herein by reference. The volumetric filler disclosed herein comprises a fluid reservoir for containing the fluid to be dispensed. The fluid reservoir is connected to a fluid source and the level of fluid within the fluid reservoir is regulated in a side tube. A fill tube is communicatively connected to the fluid reservoir. The fill tube forms a closed circuit with the fluid reservoir thereby eliminating the need for venting. A fill valve controls the flow of fluid from the fluid reservoir into the fill tube. A discharge valve dispenses fluid from the fill tube into a container. The fill valve and the discharge valve are controlled by a programmable controller which is operatively connected to a pair of level sensors disposed along the length of the fill tube. The level sensors detect the level of fluid in the fill tube and the distance between the sensors along with the size of the tube determines the fill volume.

In operation, fluid is transferred from the fluid reservoir into the fill tube by opening the fill valve. When the fluid level in the fill tube reaches a first predetermined height, the fill valve is closed and the discharge valve is opened to dispense the fluid into a container. When the fluid level in the fill tube drops to a second predetermined level, the discharge valve is closed and the cycle is repeated.

The present invention may also be used in time pressure fillers. This embodiment also includes a flexible fluid reservoir for containing the fluid to be dispensed. A drain line is connected to the output of the fluid reservoir which includes a drain valve. The drain valve is open for a predetermined period of time to dispense fluid from the reservoir into a receptacle. As long as the pressure and orifice size is maintained constant, the same volume of fluid is dispensed during each cycle.

A primary advantage of using a flexible bag-like enclosure is that the reservoir will expand and contract to maintain a constant internal pressure. Another advantage of using a flexible bag-like enclosure as a fluid reservoir is disposability. The fluid reservoir 12 can be provided with all the necessary connectors to enable substitution of one for another. By making the fluid reservoir 12 disposable, the present invention avoids the necessity of cleaning and sterilizing those parts. The old reservoir can simply be discarded and a new one installed in its place.

In another aspect of the present invention, a rigid container can be used as a fluid reservoir in place of the flexible bag-like enclosure. If a rigid container is used, an external bladder is attached to the fluid reservoir which communicates with the interior of the reservoir. The external bladder expands and contracts to regulate the internal pressure of the fluid reservoir in the same manner as the flexible bag-like enclosure.

In yet another aspect of the present invention, a flexible bag-like enclosure can be disposed in a rigid housing. The housing serves as a containment vessel for the fluid reservoir. Additionally, the housing can be made air tight and be pressurized.

Because there are no moving parts in contact with the fluid, the fluid dispensing apparatus of the present invention virtually eliminates the risk of particulate contamination of the fluid. Additionally, the fluid reservoir can be removed and replaced between production runs thereby eliminating the costs associated with cleaning and sterilizing. Another significant benefit is that sterilization or clarification filters can be used with the present invention since the flexible fluid reservoir will always operate under constant pressure. That is, pressure drop across the filter will not effect the operation of the filler. The reservoir itself will expand and contract to maintain a constant pressure.

Based on the foregoing, it is a primary object of the present invention to provide a fluid dispensing apparatus in which all components that contact the fluid can be supplied pre-cleaned and pre-sterilized.

Another object of the present invention is to provide a fluid dispensing apparatus which avoids the problems of microbial and particulate contamination.

Another object of the present invention is to provide a fluid dispensing apparatus which can be used with sterilizing or clarification filters without effecting the operation of the fluid dispensing apparatus.

Yet another object of the present invention is to provide a fluid dispensing apparatus which can accurately fill bottles and other receptacles to within ±0.5% of the fill volume.

Another object of the present invention is to provide a fluid dispensing apparatus which is capable of filling bottles having volumes in the range of 0.1 cc to 1.0 liters or more.

Still another object of the present invention is to provide a fluid dispensing apparatus capable of filling up to 300 bottles per minute or at speeds comparable to piston filling for aqueous liquids.

Another object of the present invention is to provide a fluid dispensing apparatus which is simple in construction and reliable in operation.

Other objects and advantages of the present invention will become apparent and obvious from a study of the following description and the accompanying drawings which are merely illustrative of such invention.

DETAILED DESCRIPTION OF THE INVENTION

Figure 1:
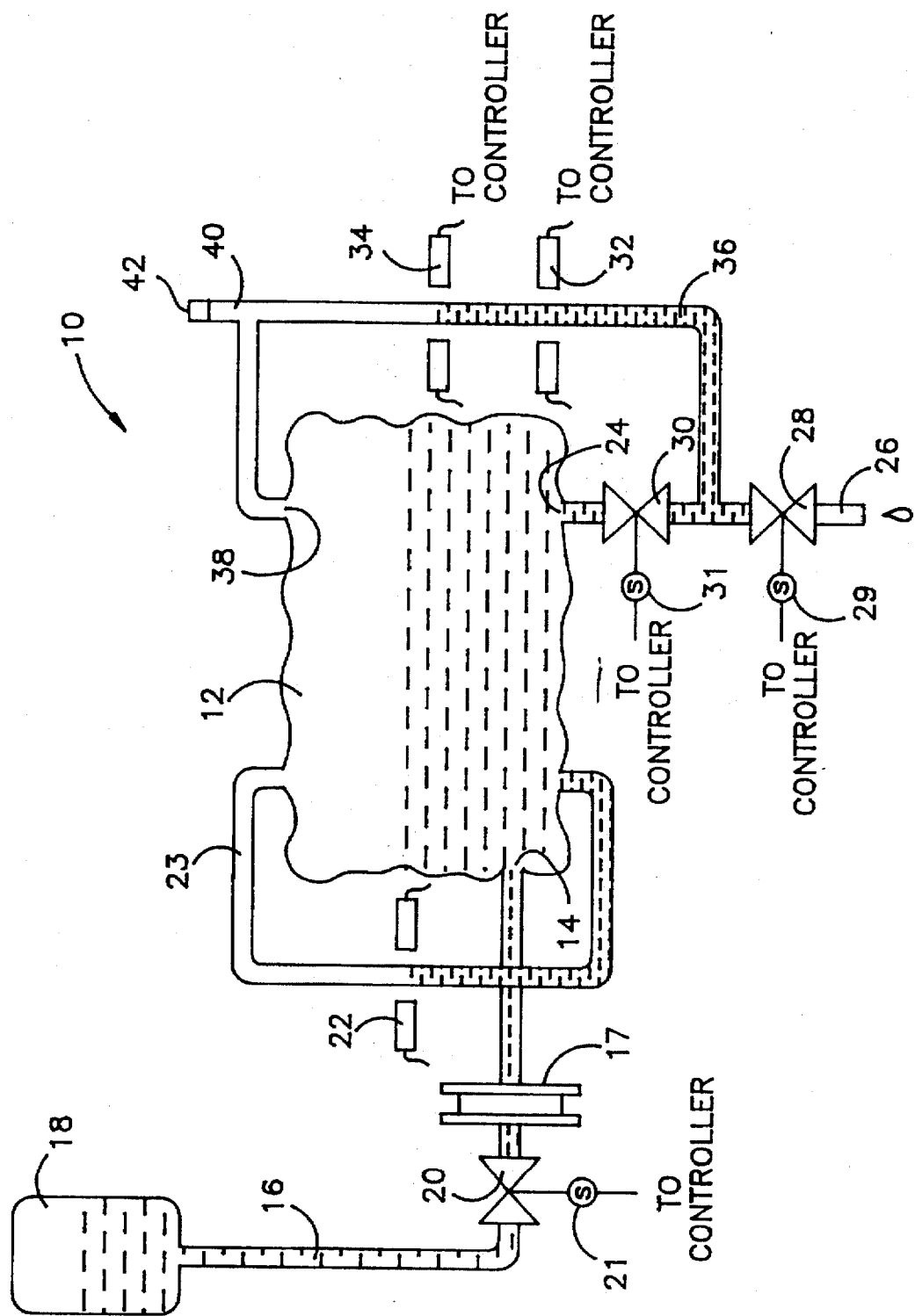
FIG. 1 is a schematic diagram illustrating a preferred embodiment of the fluid-dispensing apparatus of the present invention.

Referring now to the drawings, and more particularly to FIG. 1, the dispensing apparatus of the present invention is shown therein and indicated generally by the numeral 10. The dispensing apparatus 10 includes a fluid reservoir 12 having a fill port 14 which is connected by a fluid supply line 16 to a fluid source 18. A sterilization or clarification filter 17 is disposed in the fluid supply line 16. The fluid reservoir 12 is a sealed, flexible bag-like enclosure which expands and contracts during operation as will be hereinafter described. The fluid supply line 16 includes a supply valve 20 which is activated by solenoid 21. To maintain the fluid level in the fluid reservoir 12 at a predetermined level, a fluid level sensor 22 is positioned along a side tube 23. One end of the measuring tube 23 is connected to a lower portion of the fluid reservoir 12 while the opposite end is connected to an upper portion of the fluid reservoir 12 (called the "head space") as shown in FIG. 1. The level of fluid in the measuring tube 23 is equal to the level of fluid in the fluid reservoir 12. The fluid level sensor 22 snaps around the outside of the side tube 23 and its vertical position determines the fluid level in the fluid reservoir. A programmable controller (not shown) is operatively connected to the fluid level sensor 22 and solenoid 21. When the fluid level in the fluid reservoir 12 drops below the level of the sensor 22, the programmable controller opens supply valve 20 to introduce more fluid into the fluid reservoir 12. Thus, the level of fluid in the fluid reservoir will always remain constant. It will be appreciated also that multiple sensors 22 could be used along with side to define upper and lower limits.

The fluid reservoir 12 includes a drain port 24 which is connected to a fill tube 36. The fill tube 36 is connected at one end to the drain port 24 in a lower portion of the fluid reservoir 12. The opposite end of the fill tube 36 connects to a vent 38 in the upper portion of the fluid reservoir 12. Thus, the fill tube 36 forms a closed loop with the fluid reservoir 12. A fill valve 30 is disposed in the closed loop for controlling the flow of fluid from the fill reservoir 12 to the fill tube 36. The fill valve 30 is controlled by solenoid 31 which is connected to the programmable controller.

A drain line 26 connects to the fill tube 36 for dispensing fluid from the fill tube 36 into a container. Drain line 26 includes a drain valve 28 for dispensing fluid as will be hereinafter described. The drain valve 28 is controlled by a solenoid 29 which is activated by the programmable controller.

A pair of optical-level sensors 32 and 34 are disposed along the fill tube 36. Both sensors 32 and 34 must be disposed below the level of the fluid in the fluid reservoir 12. The upper level sensor 34 defines an upper level of fluid in the fill tube 36. The lower level sensor 32 defines a lower level of fluid. The volume of fluid dispensed is determined by the distance between the upper and lower level sensors 32 and 34 and the diameter of the fill tube 36. Both sensors 32 and 34 are connected to the programmable controller.

A meniscus sensor 42 may be included in addition to or in place of level sensors 32 and 34. If a meniscus sensor 42 is used, it is located in a tube extension 40 in the fill-tube loop 36. The meniscus sensor 42 is a laser-type sensor which measures the height of the meniscus in the fill tube 36. The output of the meniscus sensor 42 is transmitted to the programmable controller which uses the information to improve the accuracy of the fill volume.

Figure 2A:
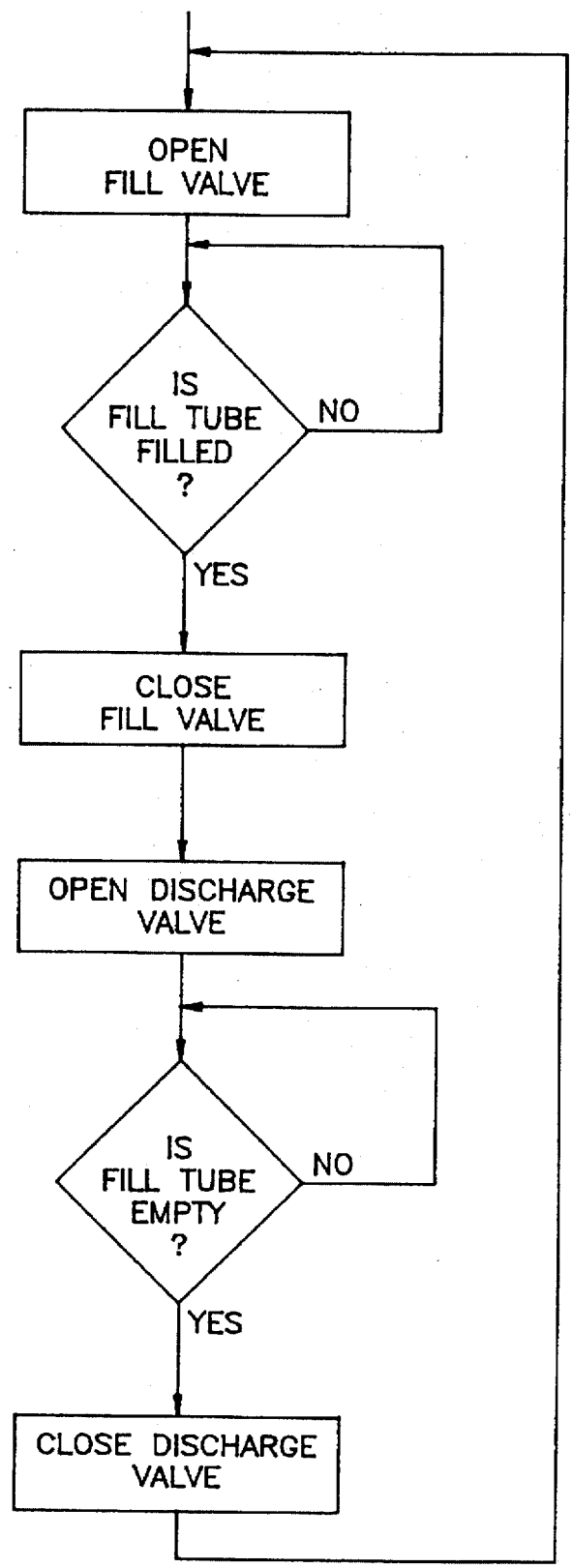
FIG. 2a is a flow diagram illustrating the mode of operation of the fluid-dispensing apparatus during a dispense cycle.
Figure 2:
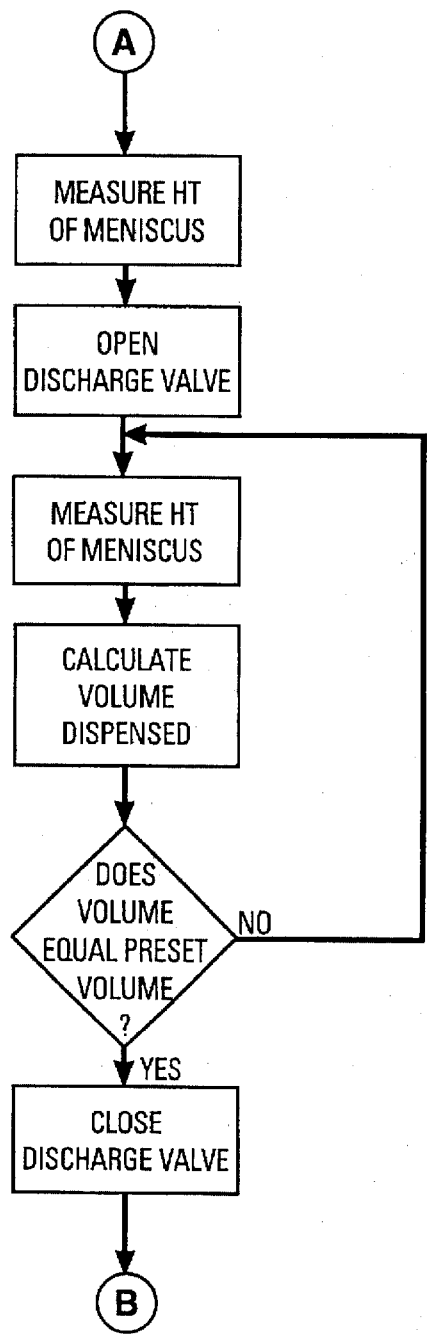
FIG. 2b is a flow diagram illustrating an alternate mode of operation of the fluid-dispensing apparatus during the dispense stage of the dispense cycle.
FIG. 2c is a flow diagram illustrating a second alternate mode of operation during the dispense stage of the dispense cycle.
Figure 2:
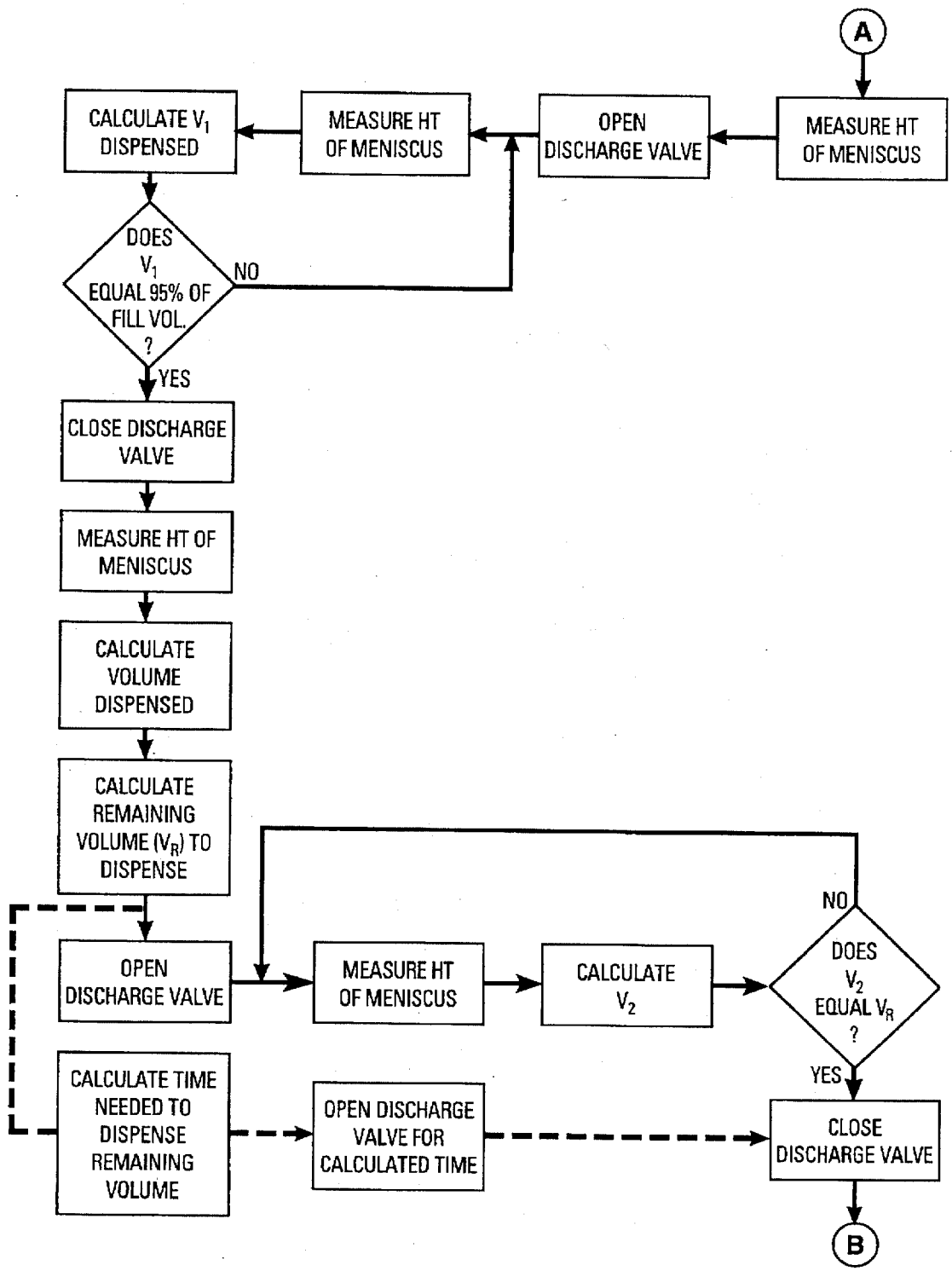

The programmable controller controls the operation of the fluid dispensing apparatus 10 as shown in FIG. 2A. The dispensing cycle includes a filling stage during which the fill tube 36 is filled with fluid, and a dispense stage in which the fluid is dispensed into a container. At the start of a filling stage, the fluid level in the fill tube 36 is at the level of the first optical sensor 32. Drain valve 28 is closed and fill valve 30 is open so that fluid from the fluid reservoir 12 flows into the fill tube 36. The fluid rises in the fill tube 36 until it reaches the level of the second optical sensor 34. Once the fluid reaches this level, the programmable controller closes the fill valve 30 and opens the drain valve 28. This marks the end of the filling stage and the beginning of the dispense stage. The fluid in the fill tube 36 then drains through the drain line 26 into a container. The fluid recedes in the fill tube 36 until it reaches the level of the first optical sensor 32 at which time the drain valve 28 closes and the cycle repeats.

During the dispensing stage of the cycle, variations in the height of the meniscus may cause some deviation in the volume of fluid dispensed. The meniscus sensor 42 may be used to reject out-of-range fill volumes or to compensate for variations in the height of the meniscus. At the beginning of the dispense stage of the cycle, the height of the meniscus in the fill tube 36 is measured by sensor 42 and stored in the programmable controller's memory. Discharge valve 28 opens until the fluid drops to the level of sensor 32. When the sensor 32 detects the receding meniscus, the discharge valve 28 is closed completing the dispensing cycle. After the discharge valve closes, the final position of the meniscus is determined by the sensor 42 allowing the programmable controller to calculate the actual volume dispensed. By calculating the actual volume dispensed, out-of-range fill volumes can be rejected on line as they occur.

By knowing the height of the upper meniscus before the dispense stage of the cycle begins, the programmable controller can also delay the closing of the drain valve 28 after sensor 32 sees the receding meniscus if a smaller than normal upper meniscus has been detected. This will compensate for an otherwise, lower than normal fill volume. By measuring the position of the meniscus at the beginning of the dispense stage and then determining how long it takes to reach the position of sensor 32, a delay can be calculated by the controller which will enable drain valve 28 to remain open an additional amount of time needed to yield the correct fill volume.

The meniscus sensor 42 can also be used to replace the lower sensor 32. FIGS. 2B and 2C show alternate modes of operation during the dispensing stage which eliminate the need for level sensor 32. Referring now to FIG. 2B, the dispense stage begins by measuring the height of the meniscus in the fill tube 36 and opening the discharge valve 28. While fluid is being dispensed, the controller continuously monitors the height of the meniscus in a manner similar to Doplar radar as it recedes and calculates the volume of fluid dispensed. When the calculated value of the fluid dispensed equals a predetermined fill volume, which is set by the user, the discharge valve 28 is closed. The dispensing cycle will then be repeated indefinitely until the apparatus is turned off.

In a third mode of operation, shown in FIG. 2C, a first predetermined volume (V) is dispensed which is equal to approximately 95% of the desired fill volume. After the first predetermined volume ($V_1$) is dispensed, the controller calculates the amount actually dispensed based on the position of the meniscus and determines the remaining volume ($V_R$) needed to equal the total fill volume. The discharge valve 28 is reopened to dispense the remaining volume ($V_R$) which is approximately 5% of the total fill volume. While dispensing the remaining 5%, the height of the meniscus is continuously measured and the volume dispensed ($V_2$) is calculated. With the amount dispensed ($V_2$) equals the remaining volume calculated by the controller, the discharge valve 28 is closed. Alternately, the remaining 5% could be dispensed by opening the discharge valve 28 for a predetermined time period which is calculated by the controller based on the pressure in the fluid reservoir 12 and the specific gravity of the fluid. This alternate method for dispensing the remaining 5% is shown by dotted lines in FIG. 2C. The advantage of this approach is that it greatly reduces the amount of error for extremely accurate filling. The disadvantage is that it increases the time needed to dispense a given volume of fluid.

The present invention solves the problem experienced in the past with using clarification filters in volumetric filters. Because the fluid reservoir 12 is flexible, it can expand and contract during use to maintain the internal pressure of the fluid reservoir 12 constant. No external pressure source is required. The fluid dispensing apparatus 10 will be self-regulated and will maintain an internal pressure equal to the external pressure, which will ordinarily be atmospheric pressure. Because the fluid dispensing apparatus is self-regulating, the pressure drop across the clarification filter will not effect its operation.

Figure 3:
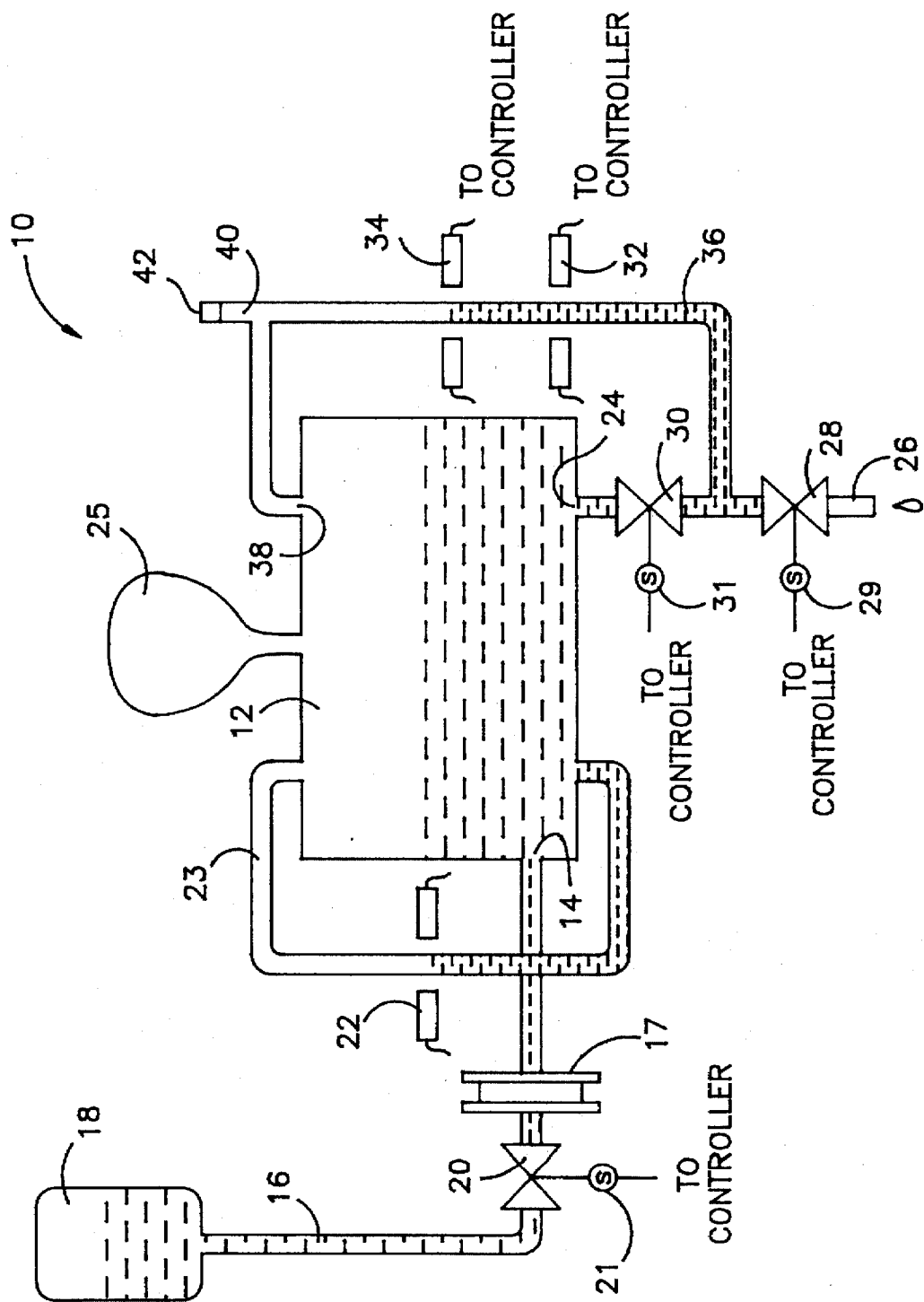
FIG. 3 is a schematic diagram illustrating a second embodiment of the fluid dispensing apparatus.

Referring now to FIG. 3, an alternate embodiment of the present invention is shown. The embodiment shown in FIG. 3 differs from the first embodiment only in that the fluid reservoir 12 comprises a rigid enclosure whereas the fluid reservoir 12 in the first embodiment comprises a flexible, bag-like enclosure. A flexible bladder 25 communicates with the interior of the fluid reservoir 12. The flexible bladder 25 serves to regulate the pressure in the fluid reservoir 12.

Figure 4:
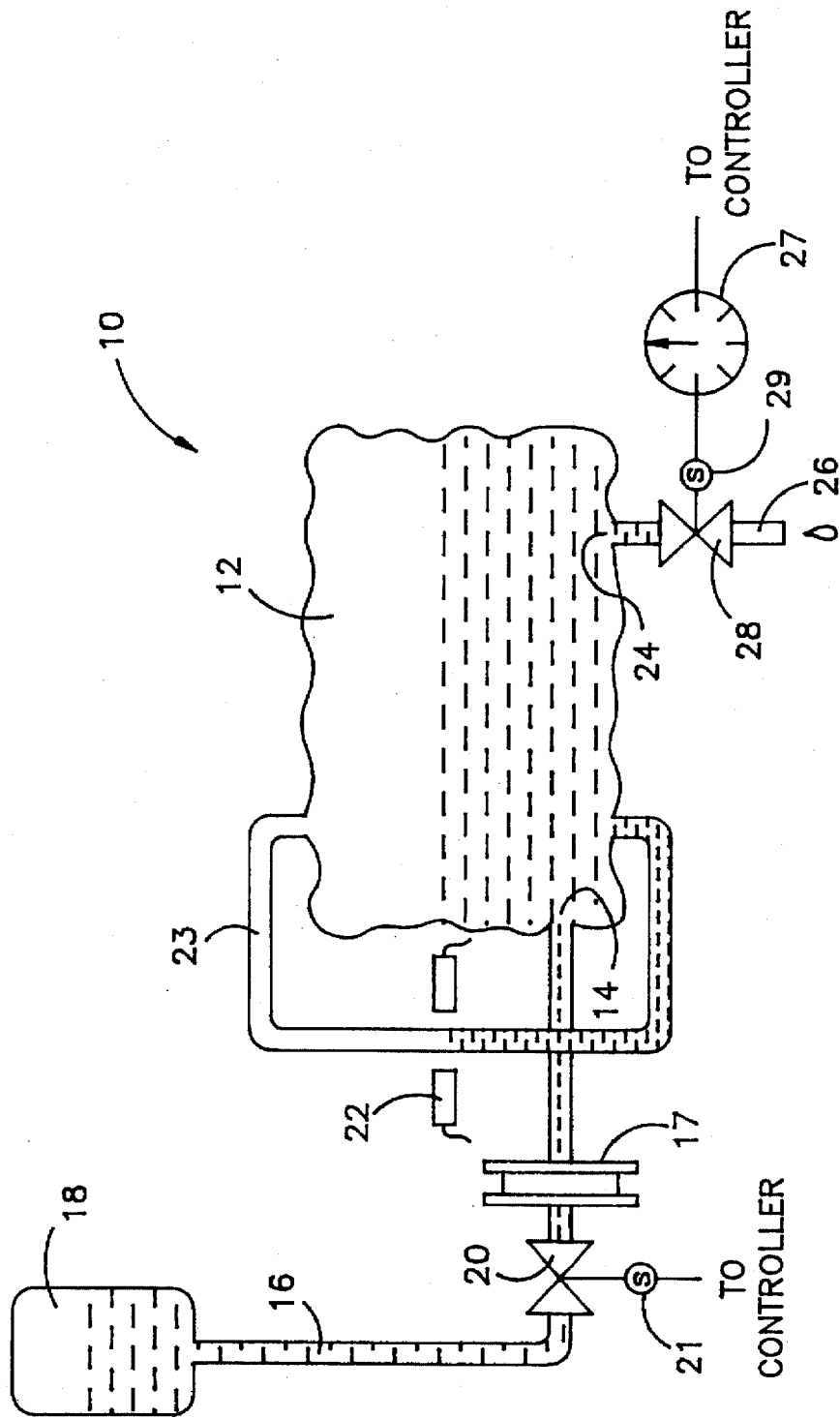
FIG. 4 is a schematic diagram illustrating a third embodiment of the fluid dispensing apparatus.

FIG. 4 illustrates a third embodiment similar to the embodiment in FIG. 1. However, the embodiment shown in FIG. 4 is configured for time-pressure filling. The fill tube 36 of the first embodiment and its associated sensors 32 and 34 are eliminated. In its place, a timer 27 is connected to the solenoid 29 which controls the drain valve 28. When a bottle is positioned beneath the drain line 26, the drain valve 28 is opened and the fluid is dispensed from the fluid reservoir 12 into the bottle. After a predetermined period of time has elapsed, the timer 27 causes the drain valve 28 to close to stop the flow of fluid from the fluid reservoir 12. As in the first embodiment, this embodiment can be used with a clarification filter 17 since the fluid reservoir 12 will expand and contract to maintain the pressure constant. Thus, the pressure drop across the clarification filter 17 does not interfere with the operation of the fluid dispensing apparatus 10.

Figure 5:
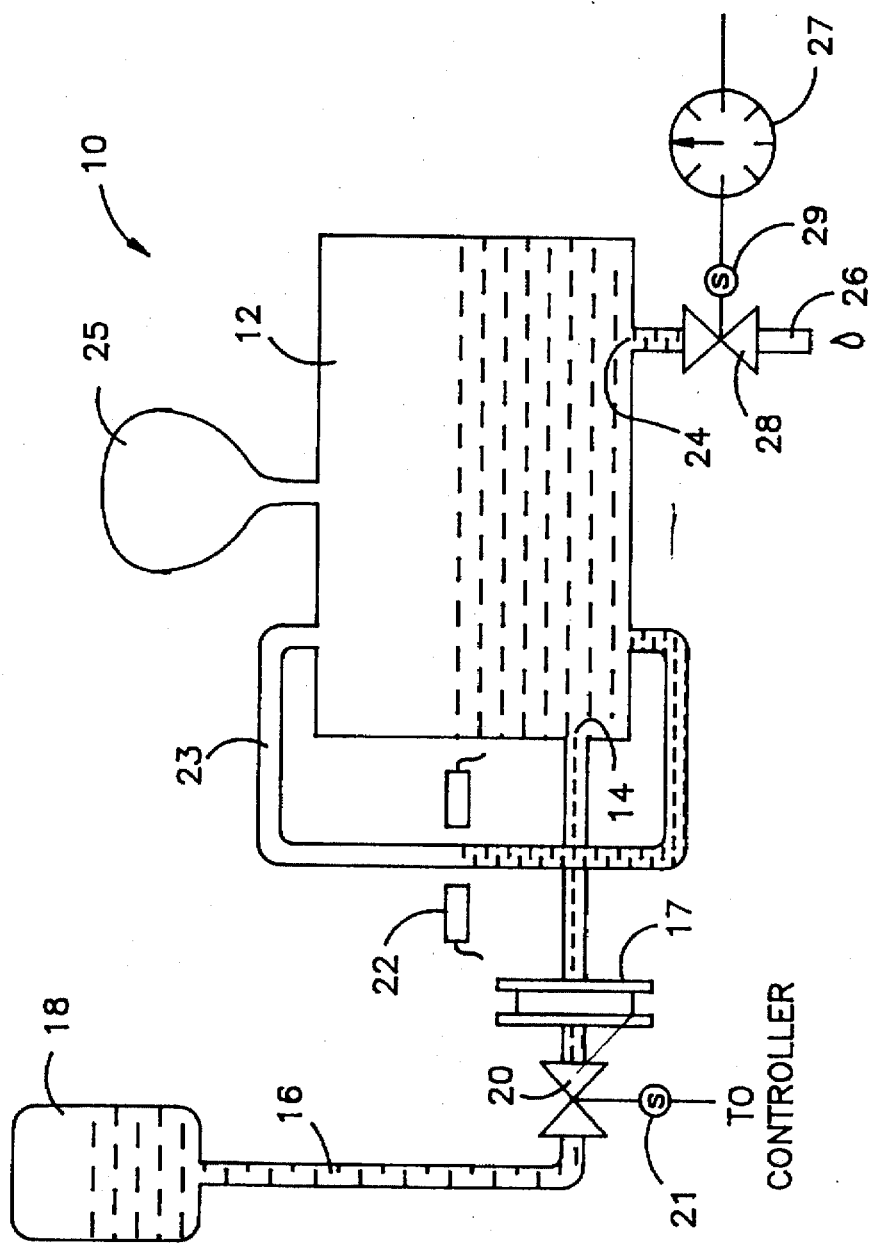
FIG. 5 is a schematic diagram illustrating a fourth embodiment of the fluid dispensing apparatus.

FIG. 5 shows a fourth embodiment of the present invention which is similar to the embodiment shown in FIG. 3. The embodiment shown in FIG. 5 is also configured for time-pressure filling. However, the fluid reservoir 12 has a rigid wall and is provided with a bladder 25 for regulating pressure within the fluid reservoir 12.

Figure 6:
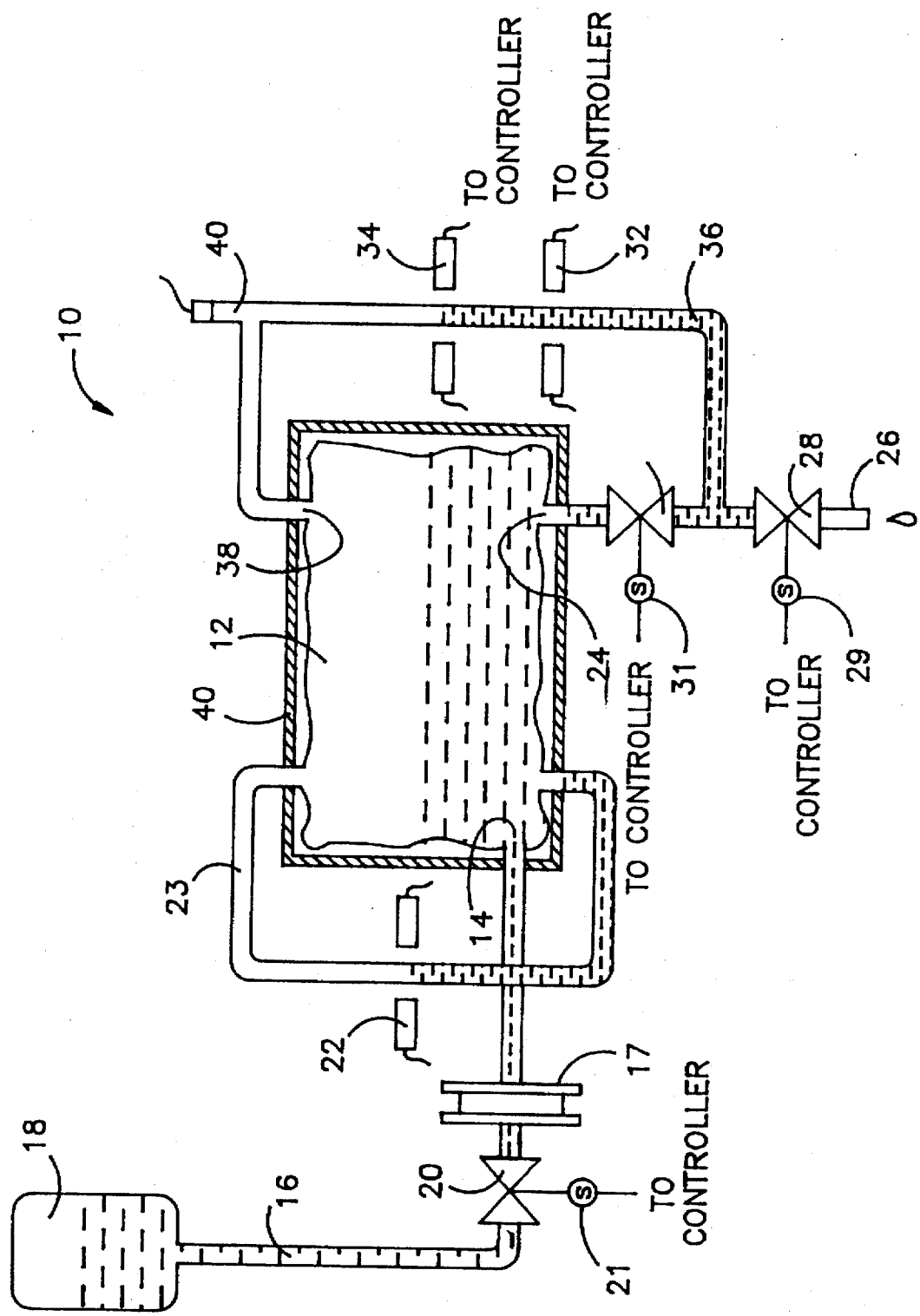
FIG. 6 is a schematic diagram illustrating a fifth embodiment of the fluid dispensing apparatus.

FIG. 6 illustrates a fifth embodiment of the present invention. The embodiment shown in FIG. 6 is configured as a volumetric filler and is similar to the embodiment shown in FIG. 1. However, the embodiment shown in FIG. 6 includes a housing 40 which encloses the fluid reservoir 12. It is understood that the fluid reservoir 12 is of the flexible type. The housing 40 is constructed in two halves extending lengthwise to allow easy insertion and removal of the fluid reservoir 12 from the housing 40.

The housing 40 may serve simply as a containment vessel for the fluid reservoir, or may itself be pressurized. If the housing 40 is used as a containment vessel, as shown in FIG. 6, a small vent should be placed in the housing 40 to allow for expansion of the fluid reservoir 12. Alternatively, the housing 40 could be constructed of a porous material.

Figure 7:
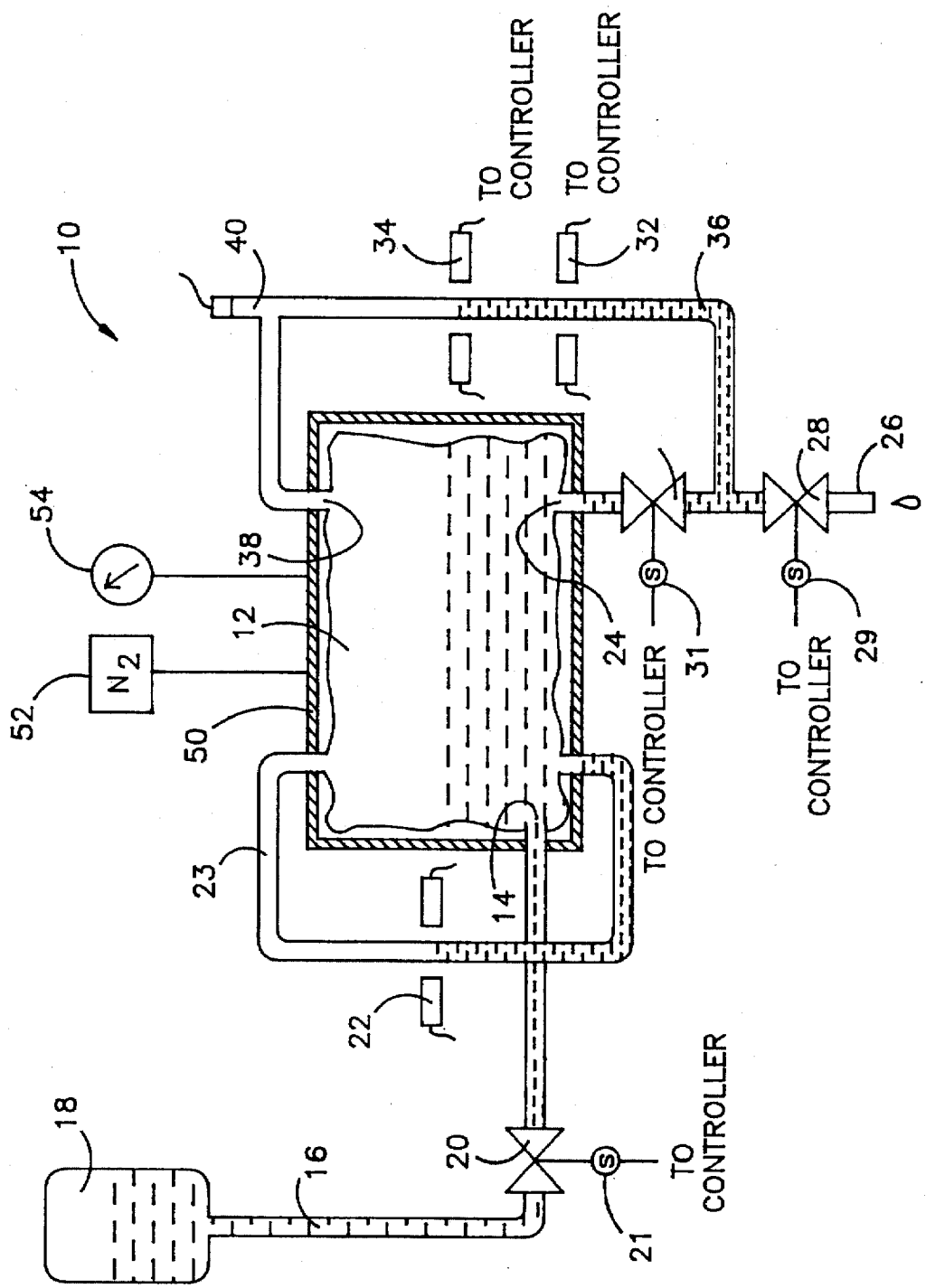
FIG. 7 is a schematic diagram illustrating a sixth embodiment of the fluid dispensing apparatus.
Figure 8:
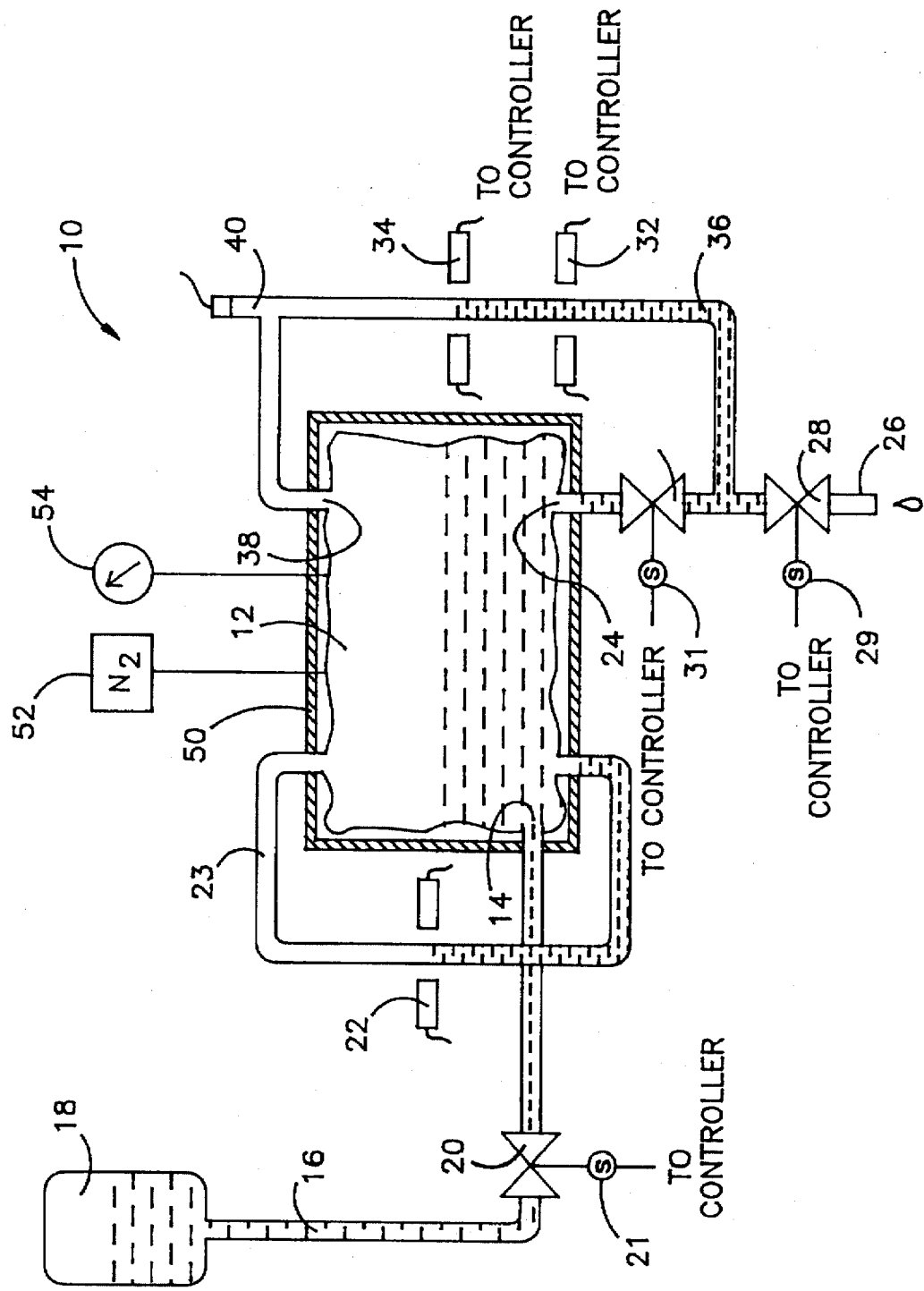
FIG. 8 is a schematic diagram illustrating a seventh embodiment of the fluid dispensing apparatus.

If the housing 40 is pressurized, as shown in FIG. 7, air tight seals should be used between the housing 40 and the fluid reservoir at fill port 14, around the side tube 23, at vent 38, and at drain port 24. The fluid reservoir 12 may also be pressurized as shown in FIG. 8. Both the housing 40 and reservoir 12 can be pressurized at the same time. If the housing 40 or the fluid reservoir 12 is pressurized, the clarification filter 17 should preferably be removed to avoid errors resulting from the pressure drop across the filter.

Based on the foregoing, it is apparent that the present invention provides a fluid dispensing apparatus in which all of the components which come in contact with the fluid being dispensed can be pre-cleaned and sterilized. These components can be easily and quickly replaced thereby eliminating down time while components are being cleaned. The present invention also may be used with clarification filters without the errors associated with prior art devices.

What is claimed is:

1. A fluid dispensing apparatus for dispensing a predetermined volume of fluid comprising:
   a) a pliable fluid reservoir which expands and contracts to maintain the internal pressure in said fluid reservoir constant, said fluid reservoir having a fluid input connected to a fluid supply;
   b) a fluid output in said fluid reservoir for dispensing fluid from said fluid reservoir;
   c) a discharge valve connected to said fluid output for dispensing fluid from said fluid reservoir when said valve is opened; and
   d) an electronic controller for selectively opening and closing the discharge valve to dispense a predetermined volume of fluid from said fluid reservoir.

2. The fluid dispersing apparatus of claim 1 further including a fluid level regulating means for maintaining the fluid level in said fluid reservoir at a predetermined level.

3. The fluid dispensing apparatus of claim 2 wherein the fluid level regulating means includes a measuring tube forming a closed circuit with said fluid reservoir, a fluid level sensor disposed along said measuring tube for detecting the level of said fluid in said measuring tube, and control means responsive to the state of the fluid level sensor for selectively opening and closing a supply valve connected to said fluid input to regulate the flow of fluid from said fluid supply into said fluid reservoir.

4. The fluid dispensing apparatus of claim 3 wherein the fluid level sensor is external to said measuring tube.

5. The fluid dispensing apparatus of claim 4 wherein the fluid level sensor is a photo-optic sensor.

6. The fluid dispensing apparatus of claim 5 including two level sensors disposed along said measuring tube defining, respectively, the upper and lower limits of the fluid level in said fluid reservoir.

7. The fluid dispensing apparatus of claim 1 further including a fill tube forming a closed loop with said fluid reservoir, said fill tube being connected at one end to said fluid output, a fill valve disposed in the closed loop formed by the fill tube for controlling the flow of fluid into the fill tube, sensing means for detecting the level of the fluid in the fill tube, and a drain line connected to the fill tube, said drain valve being disposed in said drain line.

8. The fluid dispensing apparatus of claim 7 wherein the sensing means comprises a first optical sensor for detecting when the fill tube is filled to a predetermined level and a second optical sensor for detecting when the fluid level in the fill tube drops to a second predetermined level which is lower than the first predetermined level, wherein the controller is responsive to the state of said first optical sensor to open said drain valve and to the state of said second fluid level sensor to close said drain valve.

9. The fluid dispensing apparatus of claim 7 wherein the sensing means includes a meniscus sensor for continuously measuring the height of the meniscus in the fill tube as the fluid is dispensed; and wherein the controller is operative to continuously calculate the amount of fluid dispensed based on the measured height of the meniscus and to close the discharge valve when the calculated volume of the fluid dispensed equals the predetermined fill volume.

10. The fluid dispensing apparatus of claim 1 wherein the controller is operative to open the discharge valve for a predetermined time period to dispense a predetermined volume of fluid.

11. The fluid dispensing apparatus of claim 1 further including a clarification filter connected to the input of said fluid reservoir.

12. The fluid dispensing apparatus of claim 1 further including a rigid shell housing said pliable fluid reservoir.

13. The fluid dispensing apparatus of claim 12 wherein said fluid reservoir is removable from said rigid shell.

14. A fluid dispensing apparatus for dispensing a predetermined volume of fluid comprising:
   a) a fluid reservoir housing a fluid input connected to a fluid supply;
   b) an external bladder connected to an upper portion of said fluid reservoir which expands and contracts to maintain the internal pressure within said fluid reservoir constant;
   c) a fluid output in said fluid reservoir for dispensing fluid from said reservoir;
   d) a discharge valve connected to said fluid output for selectively dispensing fluid from said fluid reservoir when said discharge valve is open; and
   e) an electronic controller operatively connected to said discharge valve for selectively opening and closing said discharge valve to dispense a predetermined volume of fluid from said fluid reservoir.

15. The fluid dispensing apparatus of claim 14 further including a fluid level regulating means for maintaining the fluid level in said fluid reservoir at a predetermined level.

16. The fluid dispensing apparatus of claim 15 wherein the fluid level regulating means includes a measuring tube forming a closed circuit with said fluid reservoir, a fluid level sensor disposed along said measuring tube for detecting the level of said fluid in said measuring tube, and control means responsive to the state of the fluid level sensor for selectively opening and closing a supply valve connected to said fluid input to regulate the flow of fluid from said fluid supply into said fluid reservoir.

17. The fluid dispensing apparatus of claim 16 wherein the fluid level sensor is external to said measuring tube.

18. The fluid dispensing apparatus of claim 17 wherein the fluid level sensor is a photo-optic sensor.

19. The fluid dispensing apparatus of claim 16 including two level sensors disposed along said measuring tube defining, respectively, the upper and lower limits of the fluid level in said fluid reservoir.

20. The fluid dispensing apparatus of claim 14 further including a fill tube forming a closed loop with said fluid reservoir, said fill tube being connected at one end to said fluid output, a fill valve disposed in the closed loop formed by the fill tube for controlling the flow of fluid into the fill tube, sensing means for detecting the level of the fluid in the fill tube, and a drain line connected to the fill tube, said drain valve being disposed in said drain line.

21. The fluid dispensing apparatus of claim 20 wherein the sensing means comprises a first optical sensor for detecting when the fill tube is filled to a predetermined level and a second optical level sensor for detecting when the fluid level in the fill tube drops to a second predetermined level which is lower than the first predetermined level, wherein the controller is responsive to the state of said first optical sensor to open said drain valve and to the state of said second optical sensor to close said drain valve.

22. The fluid dispensing apparatus of claim 20 wherein the sensing means includes a meniscus sensor for continuously measuring the height of the meniscus in the fill tube as the fluid is dispensed; and wherein the controller is operative to continuously calculate the amount of fluid dispensed based on the measured height of the meniscus and to close the discharge valve when the calculated volume of the fluid dispensed equals the predetermined fill volume.

23. The fluid dispensing apparatus of claim 14 wherein the controller is operative to open the discharge valve for a predetermined time period to dispense a predetermined volume of fluid.

24. The fluid dispensing apparatus of claim 14 further including a clarification filter connected to the input of said fluid reservoir.

25. A fluid dispensing apparatus for dispensing a predetermined volume of fluid comprising:

a) a fluid reservoir having a fluid input connected to a fluid supply by a fluid supply line;

b) a supply valve disposed in said fluid supply line;

c) a fluid output in said fluid reservoir for dispensing fluid from said fluid reservoir;

d) fluid level regulating means for maintaining a predetermined fluid level in said fluid reservoir, said fluid level regulating means including:

i) a measuring tube forming a closed loop on said fluid reservoir, said measuring tube having a first end connected to the fluid reservoir below said predetermined fluid level, and a second end connected to said fluid reservoir above said predetermined fluid level;

ii) a fluid level sensor disposed along said measuring tube between said first and second ends for detecting the level of fluid in said measuring tube; and iii) a controller for said supply valve which causes said supply valve to open when the fluid level in said measuring tube falls below said fluid level sensor;

e) a discharge valve connected to said fluid output for dispensing fluid from said fluid reservoir when said valve is open; and f) an electronic controller for selectively opening and closing the discharge valve to dispense a predetermined volume of fluid from said fluid reservoir.

26. The fluid dispensing apparatus of claim 25 wherein the fluid level sensor is external to said measuring tube.

27. The fluid dispensing apparatus of claim 26 wherein the fluid level sensor is a photo-optic sensor.

28. The fluid dispensing apparatus of claim 25 further including a fill tube forming a closed loop with said fluid reservoir, said fill tube being connected at one end to said fluid output, a fill valve disposed in the fill tube for controlling the flow of fluid into the fill tube, sensing means for detecting the level of fluid in the fill tube, and a drain line connected to the fill tube, said drain valve being disposed in said drain line.

29. The fluid dispensing apparatus of claim 25 wherein the controller is operative to open the discharge valve for a predetermined time period to dispense a predetermined volume of fluid.

* * * * *